United States Patent [19]

Atarashi et al.

[11] Patent Number: 5,172,254
[45] Date of Patent: Dec. 15, 1992

[54] PROJECTION-TYPE LIQUID CRYSTAL DISPLAY APPARATUS

[75] Inventors: Hisashi Atarashi, Nabari; Yutaka Takafuji, Nara, both of Japan

[73] Assignee: Sharp Kabushiki Kaisha, Osaka, Japan

[21] Appl. No.: 446,304

[22] Filed: Dec. 5, 1989

[30] Foreign Application Priority Data

Dec. 5, 1988 [JP] Japan .................. 63-308568

[51] Int. Cl.⁵ .............................. G02F 1/13
[52] U.S. Cl. ...................... 359/41; 359/40; 359/68; 359/106; 353/20
[58] Field of Search ............. 353/20, 31, 33, 122; 359/40, 41, 48, 66, 68, 70, 106; 358/60, 61, 231, 232

[56] References Cited

U.S. PATENT DOCUMENTS

| 4,127,322 | 11/1977 | Jacobson et al. | 353/31 |
| 4,461,542 | 7/1984 | Gagnon | 357/331 R |
| 4,474,434 | 8/1984 | Carlsen et al. | 350/388 |
| 4,715,684 | 12/1987 | Gagnon | 357/331 R |
| 4,786,146 | 11/1988 | Ledebuhr | 359/40 |
| 4,824,214 | 4/1989 | Ledebuhr | 357/331 R |
| 4,913,529 | 4/1990 | Goldenberg et al. | 357/331 R |
| 4,936,658 | 6/1990 | Tanaka et al. | 357/338 |
| 4,989,076 | 1/1991 | Owada et al. | 350/338 |
| 5,060,058 | 10/1991 | Goldenberg et al. | 358/60 |

FOREIGN PATENT DOCUMENTS

| 0361559 | 8/1989 | European Pat. Off. | |
| 8810545 | 12/1988 | Fed. Rep. of Germany | |
| 0110864 | 8/1979 | Japan | 357/331 R |
| 62-59919 | 3/1987 | Japan | |
| 0240936 | 10/1987 | Japan | 357/338 |
| 773217 | 4/1957 | United Kingdom | |

Primary Examiner—Rolf Hille
Assistant Examiner—Tan Ho

[57] ABSTRACT

A projection-type liquid crystal display apparatus uses liquid crystal cells as light polarizing devices. This apparatus makes a polarization control of one of the two linearly polarized light components perpendicular to each other separated by the polarizing light separating device through the first liquid crystal cell and of the other of the two through the second liquid crystal cell. The liquid crystal cells directly transmit through, a linearly polarized light component incident upon pixel portions corresponding to bright pixels of an image to be projected on the screen. Further they transmit through the one incident upon pixel portions corresponding to dark pixels of the image by converting it into the other linearly polarized light component. This apparatus composes the first linearly polarized light transmitted through pixel portions of the first liquid crystal cell corresponding to bright pixels of the image and the second linearly polarized light transmitted through pixel portions of the second liquid crystal cell corresponding to the same bright pixels as the above-mentioned bright pixels through a polarized light composing device, and projects the composed light onto a screen through an optical device.

29 Claims, 3 Drawing Sheets

PROJECTION-TYPE LIQUID CRYSTAL DISPLAY APPARATUS

BACKGROUND OF THE INVENTION

1. Field of the Invention

The present invention relates to a projection type liquid crystal display apparatus using liquid crystal cells as light polarizing elements.

2. Description of the Prior Art

A conventional projection-type liquid crystal display apparatus is known which forms an image on a screen with light penetrating through a light valve consisting of a crystal liquid cells and polarizing plates which are placed on its front and back faces, respectively, as a polarizer and an analyzer, as disclosed under Japanese Provisional Publication No. 07 50010, for examples.

The conventional projection type liquid crystal display apparatus, however, has a problem in that it cannot form a bright and clear image on a screen, since it only utilizes, as a projection light, only a single component of linearly polarized light penetrating through a polarizing plate, from the random polarized light emitted from a light source. This is because it uses a light valve having a polarizing plate placed on the light incoming face of its liquid crystal cell.

SUMMARY OF THE INVENTION

An object of the present invention is to provide a projection-type liquid crystal display apparatus which can give a bright and clear image.

The present invention provides a projection-type liquid crystal display apparatus comprising:

means for separating light emitted from a light source into first and second linearly polarized light components perpendicular to each other;

a first liquid crystal cell, including a plurality of pixels for transmitting light of the first linearly polarized light component incident upon a pixel containing a first type display data from a first and second type display data indicating light to be or not to be transmitted and non-transmitted, respectively, and for converting light the first linearly polarized light component incident upon a pixel containing the second type of display data into light of a second linearly polarized light component;

a second liquid crystal cell, including a plurality of pixels for transmitting light of the second linearly polarized light component incident upon a pixel portion corresponding to the first display data of two kinds of display data to indicate a light to be or not to be transmitted, and transmits the second linearly polarized light component incident upon a pixel portion corresponding to the second display data as converting it into the first linearly polarized light component, means for composing the first and second linearly polarized light components which penetrate through a pixel portion corresponding to ether of the first and second display data, out of pixel portions of the first and second liquid crystal cells, and optical means for projecting a light composed by the polarized light composing means on a screen.

The invention is characterized by the first and second liquid crystal cells which are twisted-nematic liquid crystal cells.

The invention is characterized by the first and second liquid crystal cells which are provided with color filters, respectively.

The invention is characterized by the first and second liquid crystal cells which respectively include three liquid crystal cells each of which handles individually one incident primary color light of the linearly polarized light component separated into three primary colors.

The invention is characterized by dichroic mirrors separating the linearly polarized light component into the three primary colors.

The invention is characterized by the first and second liquid crystal cells which have a function to give a variable tone to the transmitted light.

The invention is characterized by a polarized light composing means which is a polarized light beam splitter to compose the first timeably polarized light component penetrating through the first liquid crystal cell and the second linearly polarized light penetrating through the second liquid crystal cell.

The invention is characterized by another polarized light composing means which is a polarized light beam splitter to compose the second linearly polarized light component penetrating through the first liquid crystal cell and the first linearly polarized light component penetrating through the second liquid crystal cell.

The invention is characterized by a polarized light beam splitter of plate type.

The invention is characterized by a polarized light beam splitter of cube type.

The invention is characterized by a projection lens used as an optical means.

The invention is characterized by a screen of non-transparent type.

The invention is characterized by a screen of transparent type.

As mentioned above, a projection-type display apparatus by the present invention can project a brighter and clearer image on a screen by projecting on the screen the composite light of the first linearly polarized light component penetrating through directly the first liquid crystal cell and the second linearly polarized light component penetrating through directly the second liquid crystal cell, or the composite light of the second linearly polarized light component into which the first linearly polarized light component is converted by the first liquid crystal cell and the first linearly polarized light component into which the second linearly polarized light component is converted by the second liquid crystal cell.

BRIEF DESCRIPTION OF THE DRAWINGS

These objects, the other objects, features, and merits of the invention will be clarified more expressly by the following detailed descriptions and drawings.

DETAILED DESCRIPTION OF THE PREFERRED EMBODIMENT

Figure 1:
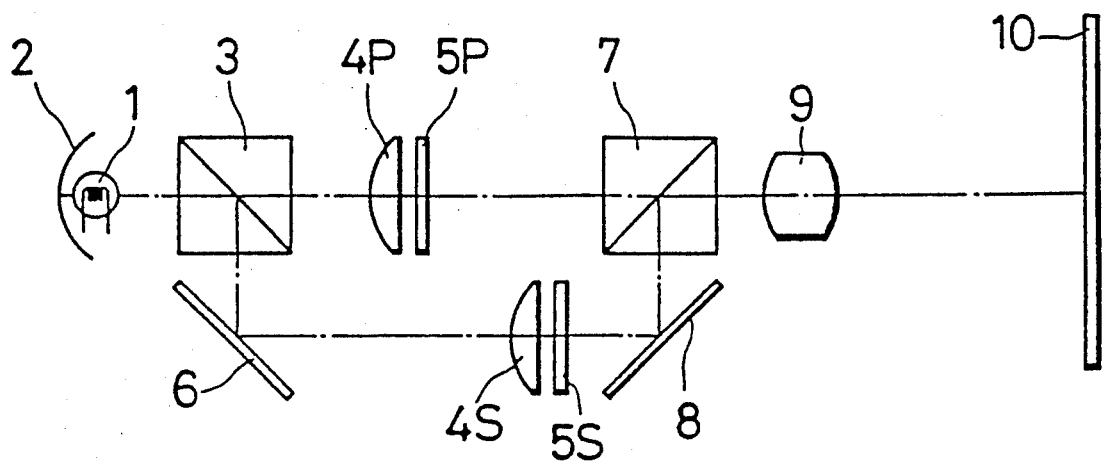
FIG. 1 is an optical system diagram showing configuration of a projection-type display apparatus of the first embodiment of the invention.

Referring to the drawings, a preferred embodiment of the invention is described in details below.

FIG. 1 is an optical system diagram showing configuration of a projection-type display apparatus of the first embodiment of the invention.

In FIG. 1, light emitted from a light source 1 is condensed by a paraboloidal condenser mirror and is emitted toward a polarized light beam splitter 3 used as polarized light separating means. The polarized light beam splitter 3 has a function to separate random polarized light emitted from the light source 1 into a P polarized light component (light penetrating through the polarized light beam splitter 3) and an S polarized light component perpendicular to the P polarized light component (light reflected by the polarized light beam splitter 3).

A condenser lens 4P focusing the P polarized light component and a twisted-nematic liquid crystal cell (hereinafter referred to as TN liquid crystal cell) 5P which is the first liquid crystal cell are located at the middle of the light path of the P polarized light component penetrating through the polarized light beam splitter 3. The TN liquid crystal cell 5P which has no polarizing plate consists of two display electrode plates forming electrodes and the like on transparent insulating substrates of glass or the like and a liquid crystal layer held between the above-mentioned two display electrode plates which form a matrix of multiple pixel portions, and is provided with a function to change an optical state of each pixel portion according to its own image data (display data of high or low brightness) by means of an active matrix drive or the like.

To be concrete, when voltage of an effective value grater than a driving threshold of the liquid crystal as display data of high brightness is applied to a portion of the liquid crystal layer corresponding to a pixel portion, liquid crystal molecules in the portion of the liquid crystal layer come into an orientation state in which they transmit through the incident P polarized light component as it is; and on the other hand, when voltage of an effective value under the threshold value as display data of low brightness is applied to a portion of the liquid crystal layer, liquid crystal molecules in this portion of the liquid crystal layer come into a twisted state in which they transmit the incident P polarized light component as rotating it by 90° to convert it into the S polarized light component.

The S polarized light component separated by the polarized light beam splitter 3 in the direction perpendicular to the light path of the P polarized light component is reflected by a plane mirror 6 located at the middle of its light path, and enters the TN liquid crystal cell 5S which is the second liquid crystal cell through the condenser lens 4S which are located at the middle of the light path of that reflected light. These condenser lens 4S and TN liquid crystal cell 5S have respectively the same functions as those of the above-mentioned condenser lens 4P and TN liquid crystal cell 5P.

That is to say, the condenser lens 4S focuses the S polarized light component reflected by the plane mirror 6, and the TN liquid crystal cell 5S transmits through, as it is, the S polarized light component incident upon a pixel portion to which voltage of an effective value over a threshold value is applied as display data of high brightness, while it transmits through the S polarized light component incident upon a pixel portion to which voltage of an effective value under the threshold value is applied as display data of low brightness, as rotating the S polarized light component by 90° to convert it into the P polarized light component.

The light which has penetrated through the TN liquid crystal cell 5P enters another polarized light beam splitter 7 which is a polarized light composing means located at the middle of its light path, and the light which has penetrated through the TN liquid crystal cell 5S is reflected by the plane mirror 8 and then enters the polarized light beam splitter 7 from the direction perpendicular to the light path of the light from the TN liquid crystal cell 5P. A projection lens 9 and a screen 10 are located in this order on the extension line of the light path of the light which enters the polarized beam splitter 7 after penetrating through the TN liquid crystal cell 5P.

In the same way as the above-mentioned polarized light beam splitter 3 for separating light, the polarized light beam splitter 7 has a function to transmit through, as it is, the P polarized light component incident upon it while reflecting the S polarized light component incident upon it. Therefore, the P polarized light component entering from the TN liquid crystal cell 5P is transmitted through the beam splitter 7 toward the screen 10 as it is, and the S polarized light component entering from the TN liquid crystal cell 5S by way of a plane mirror 8 is reflected toward the screen 10. As a result, the polarized light beam splitter 7 has a function to compose these P and S polarized light components to irradiate this composed light toward the screen 10.

Length of the light path from the TN liquid crystal cell 5S to the projection lens 9 is set so that it may be equal to length of the light path from the TN liquid crystal cell 5P to the projection lens 9. The polarized light beam splitters 3 and 7 may be either of plate type or of cube type.

Operation of the projection-type display apparatus is described in the following.

Random polarized light emitted from the light source 1 is focused by the paraboloidal condenser mirror 2 and enters the polarized light beam splitter 3. The incident light is separated by the polarized light beam splitter 3 into the P and S polarized light components. The P polarized light component enters the TN liquid crystal cell 5P through the condenser lens 4P. Each pixel portion of the TN liquid crystal cell 5P is not, according to its display data, either to an optical state in which the pixel portion transmits through the P polarized light component as it is, or to another optical state in which the pixel portion transmits through the P polarized light component as rotating it by 90° to convert it into the S polarized light component.

That is to say, voltage of an effective value over a threshold one is applied to a pixed portion corresponding to a pixel of white level (high brightness) of an image to be projected finally on the screen 10, and the P polarized light component incident upon this pixel portion penetrates through the pixel portion as it is; while voltage of an effective value under the threshold value is applied to a pixel portion corresponding to a pixel of black level (low brightness) of the image to be projected on the screen 10, and the P polarized light component incident upon this pixel portion penetrates it through as being converted into the S polarized light component.

On the other hand, the S polarized light component separated by the polarized light beam splitter 3 enters the TN liquid crystal cell 5S by way of the plane mirror 6 and the condenser lens 4S. Each pixel portion of the TN liquid crystal cell 5S also is set according to its display data either to an optical state in which the pixel portion transmits through the S polarized light component as it is, or to another optical state in which the pixel portion transmits the S polarized light component as rotating it by 90° to convert it into the P polarized light component. That is to say, voltage of an effective value over the threshold value is applied to a pixel portion corresponding to a pixel of white level of the image to be projected finally on the screen 10, and the S polarized light component incident upon this pixel portion penetrates through the pixel portion as it is; while voltage of an effective value under the threshold one is applied to a pixel portion corresponding to a pixel of black level of the image to be projected on the screen 120 and the S polarized light component incident upon this pixel portion penetrates it through as being converted into the P polarized light component.

Out of lights entering the polarized light beam splitter 7 from the TN liquid crystal cell 5P, the P polarized light component corresponding to a pixel of white level of an image on the screen 10 penetrates through the polarized light beam splitter 7 and enters the projection lens 9, while the S polarized light component corresponding to a pixel of black level of the image on the screen 10 does not enter the projection lens 9 due to being reflected by the polarized light beam splitter 7. On the other hand, out of lights entering the polarized light beam splitter 7 from the TN liquid crystal cell 5S by way of the plane mirror 8, the S polarized light component corresponding to a pixel of white level of the image on the screen 10 is reflected by the polarized light beam splitter 7 and enters the projection lens 9, while the P polarized light component corresponding to a pixel of black level of the image on the screen 10 does not enter the projection lens 9 due to penetrating through the polarized light beam splitter 7.

Therefore, a light composed of the P polarized light component which has penetrated through the TN liquid crystal cell 5P and the S polarized light component which has penetrated through the TN liquid crystal cell 5S is magnified and projected by the projection lens 9 on a pixel of white level of the image on the screen 10. No light is projected on a pixel of black level of the image on the screen 10. In this way, a bright and clear image is enlarged and formed on the screen 10.

Figure 2:
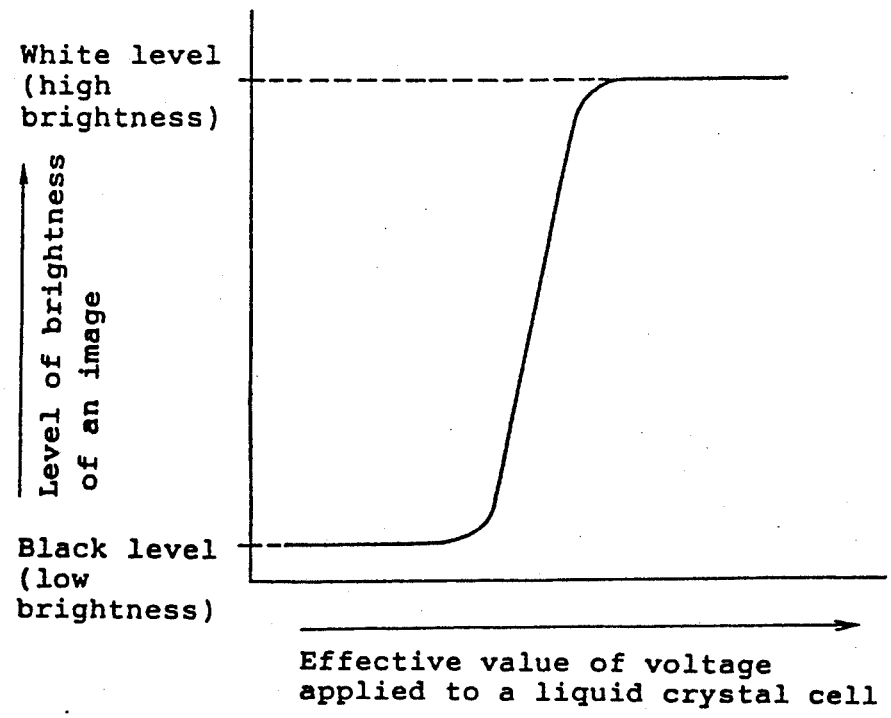
FIG. 2 is a graph showing relation between effective value or voltage applied to a pixel portion of a liquid crystal cell in the projection-type display apparatus and brightness of the corresponding pixel on the screen.

FIG. 2 is a graph showing relation between effective value of voltage applied to each pixel portion of the TN liquid crystal cells 5P and 5S, and level of brightness of a pixel of an image on the screen 10 corresponding to the pixel portion.

Figure 3:
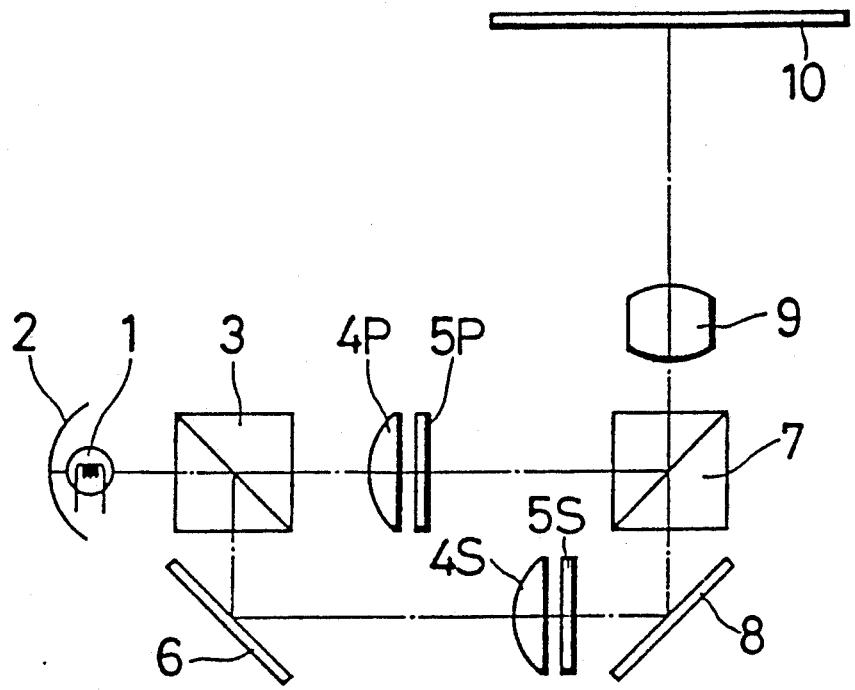
FIG. 3 is an optical system diagram showing configuration of a projection-type display apparatus of the second embodiment of the invention.

FIG. 3 is an optical system diagram showing configuration of a projection-type display apparatus of the second embodiment of the invention. Since a light source 1, paraboloidal condenser mirror 2, polarized light beam splitter 3, condenser lenses 4P and 4S, TN liquid crystal cells 5P and 5S, plane mirrors 6 and 8, and polarized light beam splitter 7 in FIG. 3 are located at the same location as the first embodiment shown in FIG. 1, description of their location is omitted here. This embodiment differs from the first embodiment in location of a projection lens 9 and screen 10, where they are located in this order in the direction perpendicular to the light path of a light entering the polarized light beam splitter 7 from the TN liquid crystal cell 5P, namely in the direction in which the S polarized light component entering the polarized light beam splitter 7 from the TN liquid crystal cell 5P is reflected.

In the TN liquid crystal cell 5P which the P polarized light component enters, voltage of an effective value under a threshold value is applied to a pixel portion corresponding to a pixel of white level of an image to be projected finally on the screen 10, and the P polarized light component incident upon this pixel portion penetrates it through as being converted into the S polarized light component; while voltage of an affective value over the threshold value is applied to a pixel portion corresponding to a pixel of black level of the image to be projected on the screen 10, and the P polarized light component incident upon this pixel portion penetrates through the pixel portion as it is. That is to say, in this embodiment, an effective value of voltage applied to each pixel portion of the TN liquid crystal cell 5P is in reverse relation to that in the first embodiment.

In the TN liquid crystal cell 5S also which the S polarized light component enters, an effective value of voltage applied to each pixel portion of the TN liquid crystal cell 5S is in reverse relation to that in the first embodiment. Voltage of an effective value under the threshold value is applied to a pixel portion corresponding to a pixel of white level of the image to be projected finally on the screen 10, and the S polarized light component incident upon this pixel portion penetrates it through as being converted into the P polarized light component; while voltage of an effective value over the threshold value is applied to a pixel portion corresponding to a pixel of black level of the image to be projected on the screen 10, and the S polarized light component incident upon this pixel portion penetrates through the pixel portion as it is.

Each function of the other optical component in this system is the same as that of the first embodiment.

In this embodiment, out of lights entering the polarized light beam splitter 7 from the TN liquid crystal cell 5P, the S polarized light component corresponding to a pixel of white level of the image on the screen 10 is reflected by the polarized light beam splitter 7 and enters the projection lens 9, while the P polarized light component corresponding to a pixel of black level of the image on the screen 10 does not enter the projection lens 9 due to penetrating through the polarized light beam splitter 7.

On the other hand, out of lights entering the polarized light beam splitter 7 from the TN liquid crystal cell 5S through the plane mirror 8, the P polarized light component corresponding to a pixel of white level of the image on the screen 10 penetrates through the polarized light beam splitter 7 and enters the projection lens 9, while the S polarized light component corresponding to a pixel of black level of the image on the screen 10 does not enter the projection lens 9 due to being reflected by the polarized light beam splitter 7.

Therefore, a light composed of the S polarized light component which has penetrated through the TN liquid crystal cell 5P and the P polarized light component which has penetrated through the TN liquid crystal cell 5S is magnified and projected through the projection lens 9 on a pixel of white level of the image on the screen 10. No light is projected on a pixel of black level of the image on the screen 10. In this way, a bright and clear image is enlarged and formed on the screen 10.

Figure 4:
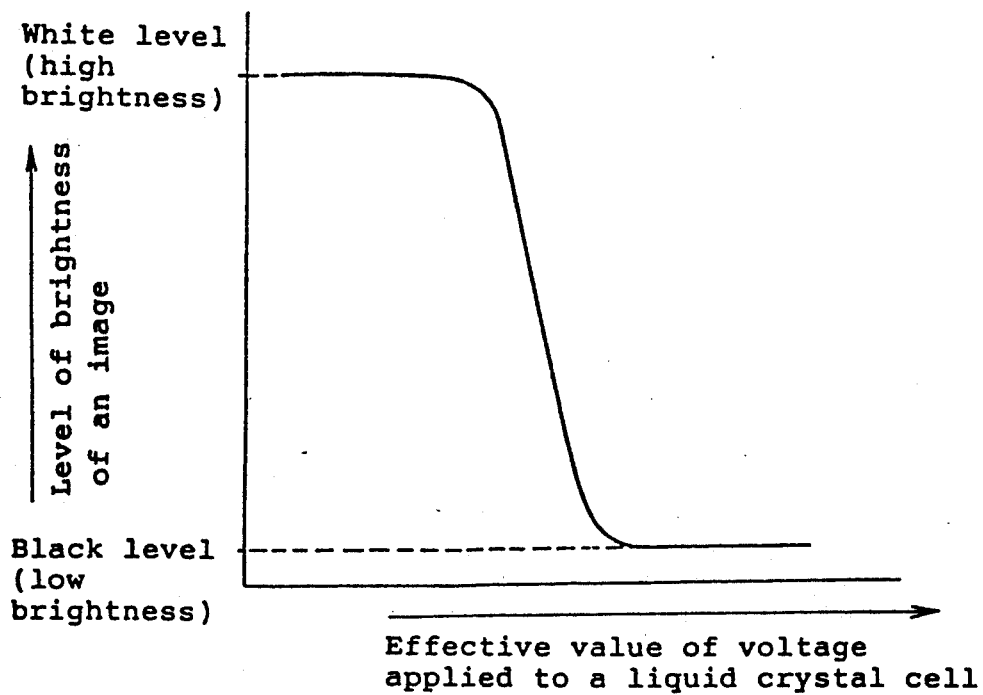
FIG. 4 is a graph showing relation between effective value of voltage applied to a pixel portion of a liquid crystal cell in the projection-type display apparatus and brightness of the corresponding pixel on the screen.

FIG. 4 is a graph showing relation between effective value or voltage applied to each pixel portion of the TN liquid crystal cells 5P and 5S, and level of brightness of a pixel of an image on the screen 10, corresponding to the pixel portion.

Additionally, an image projected on the screen can be colored by forming color filters on the TN liquid crystal cells in the embodiments in FIGS. 1 and 3.

Figure 5:
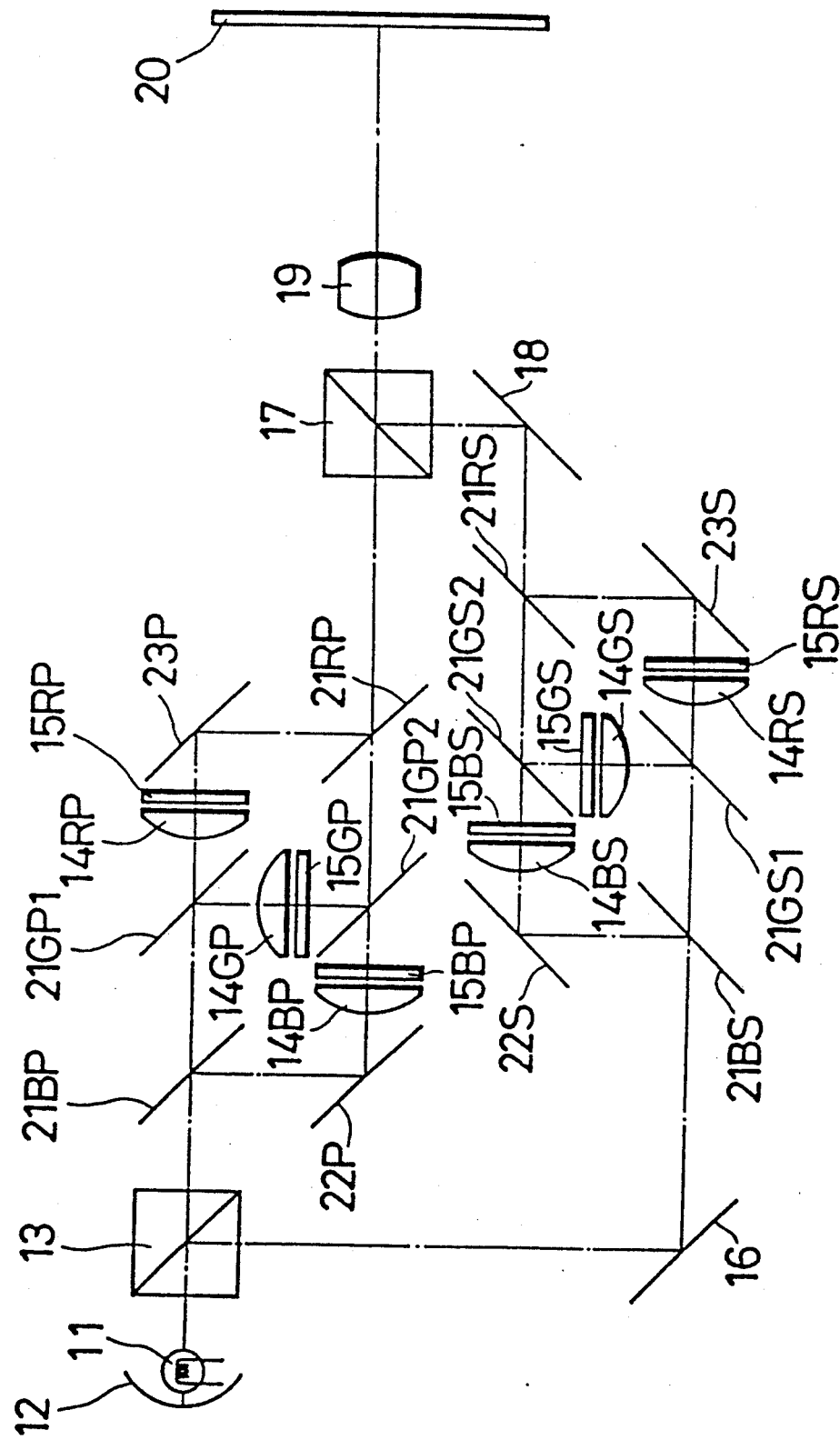
FIG. 5 is an optical system diagram showing configuration of a projection-type display apparatus of the third embodiment of the invention.

FIG. 5 is an optical system diagram showing configuration of a projection-type display apparatus of the third embodiment of the invention.

This embodiment shows a method which makes it possible not only to obtain a color image on the screen without forming color filters on the TN liquid crystal cells but also to obtain an image of higher resolution on the screen even by using some TN liquid crystal cells of the same resolution as the TN liquid crystal cells used in the embodiments shown in FIGS. 1 and 3. Its schematic configuration is similar to that of the embodiment in FIG. 1. That is to say, in FIG. 5, random polarized light emitted from a light source 11 is condensed by a paraboloidal condenser mirror 12, is irradiated toward a polarized light beam splitter 13, and is separated into P and S polarized light components by the beam splitter 13.

A dichroic mirror 21BP which reflects a blue light out of the P polarized light component and transmits the other color light is located at the middle of the light path of the P polarized light penetrating through the polarized light beam splitter 13. A dichroic mirror 21GP1 which reflects a green light out of the P polarized light component and transmits the other color light (red light) is located at the middle of the light path of the light penetrating through the dichroic mirror 21BP. A plane mirror 22P is located at the middle of the light path of the blue P polarized light component reflected by the dichroic mirror 21BP. A condenser lens 14BP and TN liquid crystal cell 15BP for blue light are located at the middle of the light path of the light reflected by the plane mirror 22P.

And a condenser lens 14GP and TN liquid crystal cell 15GP for green light are located at the middle of the light path of the green P polarized light component reflected by the dichroic mirror 21GP1. A condenser lens 14RP and TN liquid crystal cell 15RP for red light are located at the middle of the light path of the red P polarized light component penetrating through the dichroic mirror 21GP1. Each of the TN liquid crystal cells 15BP, 15GP, and 15RP which has no polarizing plate consists of two display electrode plates forming electrodes and the like on transparent insulating substrates of glass or the like and a liquid crystal layer held between the above mentioned two display electrode plates which form a matrix of multiple pixel portions, and is provided with a function to change an optical state of each pixel portion according to its image data (display data of high or low brightness for blue, green, or red light) by means of an active matrix drive or the like.

To be concrete, in case of the TN liquid crystal cell 15BP for blue light, for example, when voltage of an effective value over a threshold value for display data of high brightness for blue light is applied to a portion of the liquid crystal layer corresponding to a pixel portion, liquid crystal molecules in the portion of the liquid crystal layer come into an orientation state in which they transmit through the incident blue P polarized light component as it is, and on the other hand, when voltage of an effective value under the threshold value for display data of low brightness for blue light is applied to a portion of the liquid crystal layer corresponding to a pixel portion, liquid crystal molecules in this portion of the liquid crystal layer come into a twisted state in which they transmit the incident blue P polarized light component as rotating it by 90° to convert it into the blue S polarized light component. The other two TN liquid crystal cells 15GP and 15RP also have the same function as mentioned above for color light which they handle, respectively.

A dichroic mirror 21GP2 which reflects green light and transmits the other color light is located at the point of intersection of the light path of the light penetrating through the TN liquid crystal cell 15BP and the light path of the light penetrating through the TN liquid crystal cell 15GP. A plane mirror 23P is located at the middle of the light path of the red P polarized light component penetrating through the TN liquid crystal cell 15RP, and a dichroic mirror 21RP which reflects red light and transmits the other color light is located at the point of intersection of the light path of the light reflected by the plane mirror 23P and the light reflected by or penetrating through the dichroic mirror 21GP2.

The S polarized light component separated by the polarized light beam splitter 13 is reflected by a plane mirror 16, and a dichroic mirror 21BS which reflects blue light out of this S polarized light component and transmits the other color light is located at the middle of the light path of the light reflected by the plane mirror 16. As described below, dichroic mirrors 21GS1, 21GS2, and 21RS, plane mirrors 22S and 23S, condenser lenses 14BS, 14GS and 14RS, and TN liquid crystal cells 15BS, 15GS, and 15RS which respectively have the same function as dichroic mirror 21GP1, 21GP2, and 21RP, plane mirrors 22P and 23P, condenser lenses 14BP, 14GP, and 14RP, and TN liquid crystal cells 15BP, 15GP, and 15RP in an optical system for the P polarized light component are located similarly to the optical system for the P component.

A light penetrating through or reflected by the dichroic mirror 21RP enters a polarized light beam splitter 17 for composing lights which is located at the middle of its light path, while a light penetrating through or reflected by the dichroic mirror 21RS is reflected by a plane mirror 18 located at the middle of its light path and then enters the polarized light beam splitter 17 from the direction perpendicular to the light path of the light coming from the dichroic mirror 21RP. A projection lens 19 and screen 20 are located in this order on the extension line of the light path of the light penetrating through the dichroic mirror 24RP and entering the polarized light beam splitter 17.

In the same way as the polarized light beam splitter 13 for separating light, the polarized light beam splitter 17 has a function to transmit through, as it is, the P polarized light component incident upon it while reflecting the S polarized light component incident upon it. That is to say, the polarized light beam splitter 17 has a function to compose the P polarized light component entering it from the dichroic mirror 21RP and the S polarized light component entering it from the dichroic mirror 21RS through the plane mirror 18 to irradiate the composed light toward the screen 20. Length of the light path from the TN liquid crystal cell 15BP, 15GP, or 15RP to the projection lens 19 is set so that it may be equal to length of the light path from the TN liquid crystal cell 15BS, 15GS, or 15RS to the projection lens 19, respectively.

Operation of the above-mentioned projection-type display apparatus is described in the following.

Random polarized light emitted from the light source 11 is condensed by the paraboloidal condenser mirror 12 and enters the polarized light beam splitter 13. The incident light is separated by the polarized light beam splitter 13 into the P and S polarized light components. The P polarized light component is still more separated into blue, green, and red lights by the dichroic mirrors 21BP and 21GP1. Out of them, the blue P polarized light component enters the TN liquid crystal cell 15BP through the plane mirror 22P and condenser lens 14BP, the green P polarized light component enters the TN liquid crystal cell 15GP through the condenser lens 14GP, and the red P polarized light component enters the TN liquid crystal cell 15RP through the condenser lens 14RP. Each pixel portion of the TN liquid crystal cells 15BP, 15GP, and 15RP is set, according to its display data, either to an optical state in which the pixel portion transmits through the P polarized light component as it is, or to another optical state in which the pixel portion transmits through the P polarized light component as rotating it by 90° to convert it into the S polarized light component.

On the other hand, the S polarized light component separated by the polarized light beam splitter 13 is still more separated by the dichroic mirrors 21BS and 21GS1 into blue, green, and red lights through the plane mirror 16, and then these separated lights enter the TN liquid crystal cells 15BS, 15GS, and 15RS respectively in the same way as those in case of the P polarized light component. Each pixel portion of the TN liquid crystal cells 15BS, 15GS, and 15RS is set, according to its display data, either to an optical state in which the pixel portion transmits through the S polarized light component as it is, or to another optical state in which the pixel portion transmits through the S polarized light component as rotating it by 90° to convert it into the P polarized light component.

Out of lights entering the polarized light beam splitter 17 from the dichroic mirror 21RP, the P polarized light component penetrates through the polarized light beam splitter 17 and enters the projection lens 19, while the S polarized light component does not enter the projection lens 19 due to being reflected by the polarized light beam splitter 17. On the other hand, out of lights entering the polarized light beam splitter 17 from the dichroic mirror 21RS through the plane mirror 18, the S polarized light component is reflected by the polarized light beam splitter 17 and enters the projection lens 19, while the P polarized lights component does not enter the projection lens 19 due to penetrating through the polarized light beam splitter 17.

Therefore, a light composed of a color light of the P polarized light component and that of the S polarized light component is magnified and projected through the projection lens 19 on a pixel of high brightness of the image on the screen 20. In this way, a bright and clear color image is enlarged and formed on the screen 20. The configuration shown in FIG. 5 is based on the embodiment of the invention shown in FIG. 1, but an application of the configuration of the embodiment of the invention shown in FIG. 2 can also provide a projection-type liquid crystal display apparatus to give a color image of high resolution.

The above-mentioned embodiments of the invention show a front projection system in which an image is projected on the front face of the screen 10 or 20, but without limiting to this system the invention can be applied to a rear projection system in which an image is projected on the rear face of the screen 10 or 20 of transparent type.

Additionally, a projected image can also be toned in density by varying an effective value of voltage applied to each pixel portion of the TN liquid crystal cells according to its display data.

The present invention can be embodied in other various forms without deviating from its spirit or its main features. The above-mentioned embodiments, therefore, are only examples in every point. The scope of the invention is described in its claims, and is not restricted at all by the main text of this specification.

Moreover, every transformation or modification belonging to an equivalent scope of the claims of the invention is included in the scope of the invention.

What is claimed is:

1. A projection-type liquid crystal display apparatus comprising:
    means for separating a light emitted from a light source into first and second linearly polarized light components perpendicular to each other;
    a first liquid crystal cell, including a plurality of pixels, for transmitting light of the first linearly polarized light component incident upon a pixel containing a first type of display data from a first and second type of display data indicating light to be transmitted and nontransmitted, respectively, and for converting light of the first linearly polarized light component incident upon pixels containing a pixel corresponding to said second type of display data into light of the second linearly polarized light component;
    a second liquid crystal cell, including a plurality of pixels each containing a pixel corresponding to the first or second type of display data, for transmitting light of the second linearly polarized light component incident upon a pixel containing the first type of display data and for converting light of the second linearly polarized light component incident upon a pixel containing said second type of display data into light of the first linearly polarized light component;
    means for composing the first and second linearly polarized light components transmitted through each pixel to produce an image superposed from image data generated by said first and second liquid crystal cells; and
    optical means for projecting the composed light onto a screen.

2. The projection-type liquid crystal display apparatus according to claim 1, wherein said first and second liquid crystal cells are twisted-nematic liquid crystal cells.

3. The projection-type liquid crystal display apparatus according to claim 1, wherein said first and second liquid crystal cells include color filters.

4. The projection-type liquid crystal display apparatus according to claim 3, wherein said first and second liquid crystal cells respectively include three liquid crystals cells, each of which corresponds to one incident primary color light of the respective first and second linearly polarized light components, separated into three primary colors.

5. The projection-type liquid crystal display apparatus according to claim 4, wherein the first and second linearly polarized light components are separated into the three primary colors through dichroic mirrors.

6. The projection-type liquid crystal display apparatus according to claim 1, wherein said first and second liquid crystal cells are connected to means to give the transmitted light a variable tone.

7. The projection-type liquid crystal display apparatus according to claim 1, wherein said polarized light composing means is a polarizing light beam splitter which composes the first linearly polarized light component transmitted through said first liquid crystal cell and said second linearly polarized light component transmitted through the second liquid crystal cell.

8. The projection-type liquid crystal display apparatus according to claim 1, wherein said polarized light composing means is a polarizing light beam splitter which composes the second linearly polarized light component transmitted through said first liquid crystal cell and the first linearly polarized light component transmitted through said second liquid crystal cell.

9. The projection-type liquid crystal display apparatus according to claim 7 or 8, wherein said polarizing light beam splitter is of plate type.

10. The projection-type liquid crystal display apparatus according to claim 7 or 8, wherein said polarizing light beam splitter is of cube type.

11. The projection-type liquid crystal display apparatus according to claim 1, wherein said optical means is a projection lens.

12. The projection-type liquid crystal display apparatus according to claim 1, wherein said screen is of non-transparent type.

13. The projection-type liquid crystal display apparatus according to claim 1, wherein said screen is of transparent type.

14. A projection display apparatus, comprising:
a light source for producing light;
light separating means for separating said produced light into light of a first linearly polarized light component and light of a second linearly polarized light component, perpendicular to said first linearly polarized light component;
first image forming means, formed of plural pixels, for receiving said separated light of said first linearly polarized light component and for transmitting an input image on said separated light of said first linearly polarized light component by applying a voltage to each pixel to produce a converted second linearly polarized light component;
second image forming means, formed of a plurality of pixels, for receiving said separated light of said second linearly polarized light component and for transmitting an input image on said separated light of said second linearly polarized light component by applying the voltage to each pixel to produce a converted first linearly polarized light component; and
combining means for combining said transmitted light of said converted first and second linearly polarized light components for projection of the input image to a display medium.

15. The projection display apparatus of claim 14, further comprising:
optical projection means for projecting said combined transmitted light of said converted first and second linearly polarized light components, to said display medium.

16. The projection display apparatus of claim 14, wherein said first and second image forming means are liquid crystal display cells, each including the plurality of pixels formed in a matrix.

17. The projection display apparatus of claim 16 wherein voltage is applied to pixels of said first and second liquid crystal display cells to form the input image on said first and second liquid crystal display cells, to be transmitted on said separated light of said first and second linearly polarized light components, respectively.

18. The projection display apparatus of claim 17, wherein said light of said first and second linearly polarized light components is transmitted through pixels corresponding to said input image, of said first and second liquid crystal display cells, respectively, and light of said first and second linearly polarized light components is converted to light of said second and first linearly polarized light components, respectively, through pixels not corresponding to said input image.

19. The projection display apparatus of claim 14, further comprising:
a plurality of light color separating means for separating said light of said first and second linearly polarized light components into light of red (r), green (g) and blue (b) color components,
wherein said first and second image forming means includes a plurality of subimage forming means, one corresponding to each of said r, g, b light color components, each for receiving one of said r, g, b light color components of said first and second linearly polarized light components, respectively, and for transmitting a color component of said input image on respective ones of said first and second linearly polarized light components, and
wherein said combining means includes a plurality of subcombining means, each for combining said r, g, b light color components into transmitted light of one of said first and second linearly polarized light components, to be combined for projection of said input image to a display medium.

20. A method of display, comprising the steps of:
a) producing light from a light source;
b) separating the produced light into light of a first linearly polarized light component and light of a second linearly polarized light component, perpendicular to the first linearly polarized light component;
c) forming an input image on a first image forming device;
d) transmitting the separated light of the first linearly polarized light component through the first image forming device and forming the input image on the separated light of the first linearly polarized light component;
e) forming the input image on a second image forming device;
f) transmitting the separated light of the second linearly polarized light component through the second image forming device and forming the input image on the separated light of the second linearly polarized light component; and
g) combining the transmitted light of the first and second linearly polarized light components for projection of the input image to a display medium.

21. The method of display as claimed in claim 20, further comprising the step of:
   h) projecting the combined, transmitted light of the first and second light components, to the display medium.

22. The method of display as claimed in claim 20, wherein step (b) comprises the substeps of:
   (1) separating the light of the first linearly polarized light component into each of a red (r), blue (b), and green (g) color component, and
   (2) separating the light of the second linearly polarized light component into each of a red (r), blue (b), and green (g) color component,
   step (c) comprises the substeps of,
   (1) forming a red input subimage on a first subimage forming device,
   (2) forming a blue input subimage on a second subimage forming device, and
   (3) forming a green input subimage on a third subimage forming device,
   step (e) comprises the substeps of,
   (1) forming a red input subimage on a fourth subimage forming device,
   (2) forming a blue input subimage on a fifth subimage forming device, and
   (3) forming a green input subimage on a sixth subimage forming device,
   step (d) comprises the substeps of,
   (1) transmitting the separated red light of the first linearly polarized light component through the first subimage forming device and forming the red input subimage on the separated red light of the first linearly polarized light component,
   (2) transmitting the separated blue light of the first linearly polarized light component through the second subimage forming device and forming the blue input subimage on the separated blue light of the first linearly polarized light component, and
   (3) transmitting the separated green light of the first linearly polarized light component through the third subimage forming device and forming the green input subimage on the separated green light of the first linearly polarized light component,
   step (f) comprises the substeps of
   (1) transmitting the separated red light of the second linearly polarized light component through the fourth subimage forming device and forming the red input subimage on the separated red light of the second linearly polarized light component,
   (2) transmitting the separated blue light of the second linearly polarized light component through the fifth subimage forming device and forming the blue input subimage on the separated blue light of the second linearly polarized light component, and
   (3) transmitting the separated green light of the second linearly polarized light component through the sixth subimage forming device and forming the green input subimage on the separated green light of the second linearly polarized light component, and
   step (g) includes the substeps of
   (1) combining the red, green, and blue subimages on the separated red, green and blue light of the first linearly polarized light component,
   (2) combining the red, green, and blue subimages on the separated red, green, and blue light of the second linearly polarized light component, and
   (3) combining the combined transmitted light of the first and second linearly polarized light components, for projection of the input image to a display medium.

23. The method of display of claim 22, further comprising the step of:
   (h) projecting the combined transmitted light of the first and second linearly polarized light components, to the display medium.

24. A projection display apparatus, comprising:
   a light source for producing light;
   light separating means for separating said produced light into light of a first linearly polarized light component and light of a second linearly polarized light component, perpendicular to said first linearly polarized light component;
   first image forming means, including first color filter means formed on an incident face thereof, for receiving said separated light of said first linearly polarized light component and for transmitting a colored input image on said separated light of said first linearly polarized light component;
   second image forming means, including second color filter means formed on an incident face thereof, for receiving said separated light of said second linearly polarized light component and for transmitting a colored input image on said separated light of said second linearly polarized light component; and
   combining means for combining said transmitted light of said first and second linearly polarized light components for projection of the colored input image to a display medium.

25. The projection display apparatus of claim 24, further comprising:
   optical projection means for projecting said combined, transmitted light of the first and second linearly polarized light components, to said display medium.

26. The projection display apparatus of claim 24, wherein said first and second image forming means are liquid crystal display cells, each including a plurality of pixels formed in a matrix.

27. The projection display apparatus of claim 26, wherein voltage is applied to pixels of said first and second liquid crystal display cells to form an input image corresponding to the colored input image, on the first and second liquid crystal display cells, to be transmitted on said separated light of said first and second linearly polarized light components, respectively.

28. The projection display apparatus of claim 24, further comprising first and second convex lenses, disposed between said light separating means and said first and second color filter means, for respectively condensing said first and second linearly polarized light components onto said first and second color filter means.

29. A projection display apparatus, comprising:
   a light source for producing light;
   light separating means for separating said produced light into light of a first linearly polarized light component and light of a second linearly polarized light component, perpendicular to said first linearly polarized light component;
   first image forming means for receiving said separated light of said first linearly polarized light component and for transmitting a colored input image on said separated light of said first linearly polarized light component;

second image forming means for receiving said separated light of said second linearly polarized light component and for transmitting a colored input image on said separated light of said second linearly polarized light component; and combining means for combining said transmitted light of said first and second linearly polarized light components for projection of the colored input image to a display medium, said first and second image forming means each including a plurality of light color separating means for separating said light of said first and second linearly polarized light components into light of red (r), green (g) and blue (b) components, a plurality of sub-image forming means, one corresponding to each of said r, g, b light color components, each for receiving one of said r, g, b light color components of said first and second linearly polarized light components, respectively, and for transmitting a color component of said input image on respective ones of said first and second linearly polarized light components, and sub-combining means for combining said r, g, b color components into transmitted light of one of said first and second linearly polarized light components, respectively.

* * * * *